United States Patent [19]

Hashiue

[11] Patent Number: 4,734,581
[45] Date of Patent: Mar. 29, 1988

[54] AUTORADIOGRAPHIC PROCESS

[75] Inventor: Masakazu Hashiue, Kanagawa, Japan

[73] Assignee: Fuji Photo Film Co., Ltd., Japan

[21] Appl. No.: 904,865

[22] Filed: Sep. 8, 1986

Related U.S. Application Data

[63] Continuation of Ser. No. 729,113, Apr. 30, 1985, abandoned.

[30] Foreign Application Priority Data

May 2, 1984 [JP] Japan .................................. 59-89001
May 2, 1984 [JP] Japan .................................. 59-89002

[51] Int. Cl.$^4$ .............................................. G01T 1/10
[52] U.S. Cl. ................................ 250/327.2; 250/484.1
[58] Field of Search ........................... 250/327.2, 484.1

[56] References Cited

U.S. PATENT DOCUMENTS 3,308,438  3/1967  Spergel et al. ...................... 250/366
4,521,904  6/1985  Yakano .............................. 250/484.1
4,542,523  9/1985  Erikson ............................... 378/167

OTHER PUBLICATIONS

Chase et al., Princi. of Radioisotope Meth., (1967), p. 310.

Primary Examiner—Janice A. Howell
Assistant Examiner—Richard Hanig
Attorney, Agent, or Firm—Gerald J. Ferguson, Jr.; Michael P. Hoffman; Michael J. Foycik, Jr.

[57] ABSTRACT

An autoradiographic process for obtaining information on one or two dimensional location of radioactively labeled substances originating from an organism and resolved on a support medium, which comprises:
(1) causing a stimulable phosphor sheet comprising a stimulable phosphor, which is combined with said support medium in layers or has been integrated with said support medium, to absorb at least a portion of radiation energy emitted by the radioactively labeled substances in the support medium; and
(2) placing a photosensitive material on said stimulable phosphor sheet, and irradiating the phosphor sheet with stimulating rays to release the radiation energy stored in the phosphor sheet as stimulated emission, whereby the photosensitive material is exposed to the stimulated emission to obtain locational information on he radioactively labeled substances as an image on the photosensitive material. Other autoradiographic processes which further include photoelectrically detecting the stimulated emission to obtain the locational information as electric signals are also disclosed.

33 Claims, 5 Drawing Figures

AUTORADIOGRAPHIC PROCESS

This application is a continuation of Ser. No. 729,113 filed Apr. 30, 1985, now abandoned.

BACKGROUND OF THE INVENTION

1. Field of the Invention

The present invention relates to an autoradiographic process.

2. Description of the Prior Arts

There has been heretofore known a radiographic process termed "autoradiography" or "radioautography" comprising steps of: introducing a radioactively labeled substance into an organism; placing the organism or a part of tissue of the organism (that is, a sample or specimen) and a radiographic film such as a high-speed type X-ray film together in layers for a certain period of time to expose said film thereto; and obtaining the locational information on the radioactively labeled substance in said sample from the resolved pattern of the film. The autoradiography has been utilized, for example, to investigate the pathway and state of metabolism, absorption and excretion of the substance introduced in the organism in detail. Such autoradiography is described, for instance, in the following literature: Method in Biochemical Experiment, Volume 6, Method in Tracer Experiment I, 271–289, "8. Autoradiography" by Toru Sueyoshi & Akiyo Shigematsu (Tokyo Kagaku Dozin Ltd., 1977).

The autoradiography has been also utilized to obtain locational information on the radioactively labeled tissue of an organism and/or the radioactively labeled substances originating from an organism, which present on a medium. For instance, there is known an autoradiography comprising steps of: labeling organism-originating biopolymers such as proteins or nucleic acids with a radioactive element; resolving a mixture of the radioactively labeled biopolymers, derivatives thereof, cleavage products thereof, or synthetic products thereof on a support medium through a resolving process such as gel electrophoresis; placing the gel support and a high-speed X-ray film together in layers for a certain period of time to expose said film to the gel support, developing said film, obtaining the locational information on the radioactively labeled substances from the developed film, and then performing the identification of the polymeric substances, determination of molecular weight of the polymeric substances and isolation of the polymeric substances based on the obtained locational information.

Recently, the autoradiography has been effectively used especially for determining the base sequence of a nucleic acid such as DNA. Therefore, the autoradiography is thought to be a very usefull means in the field of structural determination of polymeric substances originating from organisms.

Nevertheless, such useful autoradiography is not free from several drawbacks in the practical use.

As described above, in the conventional autoradiography, a support medium containing radioactively labeled substances is brought into contact in the form of layers with a radiographic film such as a high-speed X-ray film for a given time so that the film is exposed to the radiation and then a visible image indicating the positions of the radioactive substances is obtained.

The primary drawback resides in that the exposure operation should be carried out at a low temperature (e.g., 0° C. to −80° C.), especially when the radiographic film is combined with a radiation intensifying screen, for a long period of time (e.g., several tens hours to several days). This is because intense radioactivity is not imparted to the substances to be labeled, a latent image in silver salt of the film formed by exposure to a radiation or light emission tends to fade at a relatively high temperature such as room temperature and to be undevelopable, and the silver salt is easily fogged chemically through migration of deleterious ingredients from the support medium carrying the sample thereto.

The second drawback resides in that the exposure operation ought to be done in a dry state to prevent the radiographic film from wetting and being chemically fogged which decrease the quality of an image.

When the image obtained by the autoradiography is fogged as described above, the accuracy of locational information on the radioactively labeled substances lowers. For these reasons, the procedure of the conventional autoradiography is complicated as a whole.

The third drawback resides in that the radiographic film is readily influenced by physical irritation and produces fogging under application of physical pressure caused by the contact of the film with the hands of operators or the instrument in the exposure operation. In order to avoid the occurrence of physical fogging on the radiographic film, high skill and caution must be taken in the handling of the film. In addition, the exposure over a long period of time causes natural radioactivities incorporated in the support medium to take part in the exposure of the radiographic film. Thus, the accuracy of the locational information on the labeled substances lowers. In order to eliminate such interference, parallel experiments using control samples are generally performed to find out proper exposure time, but such more experiments make the procedure more complicated.

Further, in the conventional autoradiography it is necessary to detect the location of the radioactively labeled substances on the visualized autoradiograph by eye observation to obtain the desired information and a long time is taken for such visual detection.

To solve the above-described problems attached to the conventional autoradiography, an autoradiographic process using a stimulable phosphor sheet comprising a stimulable phosphor as a radiosensitive material in place of the radiographic film and kits employed therefor are described in Japanese patent application No. 57(1982)-193418, No. 57(1982)-193419 and No. 58(1983)-30604 (corresponding to U.S. patent application Ser. No. 549,417 or European patent application No. 83110984.8). One of the kits is a separation type which comprises a stimulable phosphor sheet and a support medium for resolution, and the other one is an integrated type which comprises a stimulable phosphor sheet and a support medium provided thereon.

The stimulable phosphor sheet is also called a radiation image storage panel, disclosed in, for example, U.S. Pat. No. 4,239,968 and thus its general constitution is already known.

The stimulable phosphor sheet comprises a stimulable phosphor, in which said phosphor is capable of absorbing radiation energy having passed through an object or radiated from an object; and releasing the radiation energy stored therein as stimulated emission when said sheet is excited with an electromagnetic wave (stimulating rays) such as visible or infrared rays. The stimulated emission is photoelectrically detected to obtain electric signals, which is then reproduced as a visible image on a display device such as CRT or on a recording medium such as a photographic film, or represented locational information in the form of symbols and/or numerals.

According to the autoradiographic process using the stimulable phosphor sheet, not only the exposure time is greatly shortened but also the accuracy of the locational information on the radioactively labeled substances is not lowered even when the exposure is carried out at an ambient temperature or a temperature therearound. The exposure operation previously taking many hours under chilled condition, is made easy and hence, the autoradiographic procedure can be greatly simplified.

Further, the employment of the stimulable phosphor sheet in the autoradiography as a radiosensitive material substantially prevents either the chemical fog or the physical fog, both of which are the unavoidable problems in the use of a conventional radiographic film. This provides an advantageous feature in the improvement of the accuracy of the locational information and workability of the autoradiography. It is also possible to easily reduce or eliminate such disadvantageous effect on the accuracy that is caused by the natural radioactivity or the radioactivity of impurities contained in the support medium, by applying a certain electric processing to the locational information stored in the stimulable phosphor sheet.

Furthermore, the visualization is not always required to obtain the locational information on the radioactively labeled substances which are stored and recorded on the stimulable phosphor sheet, that is, the information can be obtained in the desired forms such as a visible image, symbols and/or numerical values and combinations thereof by scanning the phosphor sheet with stimulating rays such as a laser to read out the locational information. It is also possible to obtain the required information in various forms by further processing the obtained image information by use of an appropriate electric means. Namely, the information can be obtained as an alternative information by subjecting the electric signals or A/D converted digital signals having the image information to certain signal processing. For example, the electric signals or digital signals having the locational information on the labeled substances may be analyzed by means of a computer etc. to directly obtain a desired information on the organism.

The signal processing method for digital signals to obtain the locational information on the radioactively labeled substances in the form of signals or numerals, is described in Japanese patent application No. 58(1983)-1327 (corresponding to U.S. patent application Ser. No. 568,877 or European patent application No. 84100144.9), etc. This method comprises obtaining the locational information on the radioactively labeled substances (for instance, radioactively labeled DNA fragments) resolved one-dimensionally on a support medium as digital signals and then subjecting the digital signals to a signal processing, to obtain the locational information (for instance, DNA sequencing) in the desired form of symbols and/or numerals. In the specification there is also described a method for visualizing the resulting electric signals or digital signals in the form of an image by using a reproducing and recording means. Thus, obtaining the locational information on the labeled substances as a visible image makes possible to compare the information in the form of symbols or numerals with the visible image. Further, the obtained visible image can be compared with another visualized autoradiograph.

Until now, the conventional radiographic method has been almost predominantly utilized for autoradiography, so that it is requested to obtain the locational information on the radioactively labeled substances in the form of an image, which can be directly compared with another visible image obtained by the conventional method. Thus, it is desired to preserve the obtained locational information in the form of such an image.

The above-described method, however, requires an additional apparatus for the visualization of locational information on the radioactively labeled substances. Particularly, the complication of such an apparatus is inevitable as far as a visible image in a preservable form which can be easily compared with other visible images is necessarily obtained.

SUMMARY OF THE INVENTION

The present inventor has now found that a stimulable phosphor sheet on which radiation energy from the radioactively labeled substances resolved on a support medium has been stored and recorded is combined with a conventional photosensitive material in layers (in the superposed form) and then irradiated with stimulating rays to expose the photosensitive material to stimulated emission given by the phosphor sheet, to visualize the autoradiograph having locational information on the radioactively labeled substances on the photosensitive material. In other words, the inventor has found that by making the stimulable phosphor sheet to have such a function as a kind of radiographic intensifying screen, the locational information can be directly obtained as a visible image under the conditions (temperature, time, etc.) much milder than those of the conventional radiography and hence, the autoradiographic procedure can be carried out easily.

Further, the present inventor has found that the stimulated emission can be detected (read out) by reirradiating said stimulable phosphor sheet with stimulating rays. That is, the locational information can be obtained not only as a visible image but also as digital data by using a stimulable phosphor sheet, so as to obtain the information abundant in quality and quantity.

The present invention provides in one (first) aspect an autoradiographic process for obtaining information on one or two dimensional location of radioactively labeled substances originating from an organism and resolved on a support medium, which comprises:

(1) causing a stimulable phosphor sheet comprising a stimulable phosphor, which is combined with said support medium in layers or has been integrated with said support medium, to absorb at least a portion of radiation energy emitted by the radioactively labeled substances in the support medium; and (2) placing a photosensitive material on said stimulable phosphor sheet, and irradiating the phosphor sheet with stimulating rays to release at least a portion of the radiation energy stored in the phosphor sheet as stimulated emission, whereby the photosensitive material is exposed to the stimulated emission to obtain locational information on the radioactively labeled substances as an image on the photosensitive material.

The present invention provides in another (second) aspect an autoradiographic process for obtaining information on one or two dimensional location of radioactively labeled substances originating from an organism and resolved on a support medium, which comprises:

(1) causing a stimulable phosphor sheet comprising a stimulable phosphor, which is combined with said support medium in layers or has been integrated with said support medium, to absorb at least a portion of radiation energy emitted by the radioactively labeled substances in the support medium;

(2) placing a photosensitive material on said stimulable phosphor sheet, and irradiating the phosphor sheet with stimulating rays to release at least a portion of the radiation energy stored in the phosphor sheet as stimulated emission, whereby the photosensitive material is exposed to the stimulated emission to obtain locational information on the radioactively labeled substances as an image on the photosensitive material; and (3) irradiating the phosphor sheet with stimulating rays to release at least a portion of the radiation energy remaining in the phosphor sheet as stimulated emission, and detecting the stimulated emission to obtain the locational information as electric signals;

wherein the step (3) is done before or after the step (2).

Furthermore, the present inventor has found that the visualization of the autoradiograph having the locational information on the photosensitive material and the detection of the locational information in the form of electric signals can be simultaneously performed by reading out the stimulable phosphor sheet combined with the photosensitive material in layers. That is, the locational information on the radioacitively labeled substances can be obtained as a visible image and at the same time obtained as electric signals and hence, the autoradiographic procedure can be simplified.

In a further (third) aspect, the present invention provide an autoradiographic process for obtaining information on one or two dimensional location of radioactively labeled substances originating from an organism and resolved on a support medium, which comprises:

(1) placing said support medium and a stimulable phosphor sheet comprising a stimulable phosphor together in layers for a certain period of time to cause said phosphor sheet to absorb at least a portion of radiation energy emitted by the radioactively labeled substances in the support medium; and (2) separating said stimulable phosphor sheet from the support medium, placing the phosphor sheet and a photosensitive material together in layers, and then irradiating the phosphor sheet with stimulating rays to release at least a portion of the radiation energy stored in the phosphor sheet as stimulated emission, to a portion of which the photosensitive material is exposed to obtain locational information on the radioactively labeled substances as an image thereon, and another portion of which is detected to obtain the locational information as electric signals.

In a still further (fourth) aspect, the present invention provides an autoradiographic process for obtaining information on one or two dimensional location of radioactively labeled substances originating from an organism and resolved on a support medium, which comprises:

(1) causing a stimulable phosphor sheet comprising a stimulable phosphor, which is combined with said support medium in layers or has been integrated together with said support medium, to absorb at least a portion of radiation energy emitted by the radioactively labeled substances in the support medium; and (2) placing a photosensitive material on the surface of said stimulable phosphor sheet, being opposite to the surface facing the support medium, and irradiating the phosphor sheet with stimulating rays to release at least a portion of the radiation energy stored in the phosphor sheet as stimulated emission, to a portion of which the photosensitive material is exposed to obtain locational information on the radioactively labeled substances as an image thereon, and another portion of which is detected to obtain the locational information as electric signals.

The former (third) process relates to a method wherein the read-out operation is conducted in a state where the stimulable phosphor sheet and the photosensitive material are superposed with each other. The latter (fourth) process relates to a method wherein the read-out operation is conducted in a state where the stimulable phosphor sheet, the photosensitive material and the support medium are combined together in layers. In the latter process, placing said phosphor sheet and support medium together in layers may be done before the radioactively labeled substances are resolved (developed) on the support medium, or just before the phosphor sheet is caused to absorb the radiation energy emitted by the radioactively labeled substances to store and record the autoradiograph thereon.

In the present invention, the term "locational information" on the radioactively labeled substances resolved on the support medium means to include a variety of information relating to the location of the radioactively labeled substances or the aggregation thereof, being present in the support medium, such as the location, the shape, the concentration, the distribution and combinations thereof.

According to the present invention, the visualization of an autoradiograph can be performed in the much milder conditions, which has been conventionally performed by directly placing a radiographic material on a support medium having radioactively labeled substances resolved thereon for many hours under chilling. When a stimulable phosphor sheet on which the autoradiograph of the radioactively labeled substances is stored and recorded as radiation energy is irradiated with suitable stimulating rays in the state of having a photosensitive material thereon, the photosensitive material is exposed to light emitted by the phosphor sheet, and this exposure can be done at an ambient temperature for a short time. Accordingly, the chemical and physical fogs hardly appear on the obtained image.

Since the radiation energy stored in the stimulable phosphor sheet is instantaneously released as stimulated emission under irradiation with stimulating rays, the exposure of the photosensitive material can be done in the rather milder conditions even as compared with the case of exposing it using a radiographic intensifying screen. The employment of the phosphor sheet means that the exposure operation is not needed to do just after causing the phosphor sheet to absorb the radiation energy and is not restricted by time. It is also possible to expose plural photosensitive materials using only one phosphor sheet. Thus, the autoradiographic procedure is made remarkably easy.

In comparision with the case of visualization from electric signals or digital signals obtained by reading out the phosphor sheet, the visible image of the autoradiograph can be easily obtained because of no requirement of the special apparatus such as an image reproducing device and the cost for the autoradiographic procedure is reduced.

The visible image is obtained by directly visualizing the autoradiograph of the radioactively labeled substances, which is done in the similar manner to the conventional radiography, so that the comparison thereof with another autoradiographic image becomes easy. The distortion of the image does not occur and the registration of the image can be automatically made, because the image is obtained by exposing the photosensitive material in contact with the phosphor sheet.

Especially, as a result of the study, the present inventor has found that the photosensitive material may be preferably placed on the surface side of the stimulable phosphor sheet to be irradiated with stimulating rays. The light emitted by the phosphor sheet is absorbed by the photosensitive substance in the photosensitive material (that is, the photosenitive material is exposed thereto) to contribute to the formation of an image. The photosensitive material is substantially exposed not to the stimulating rays but to the emitted light, because the wavelength region of the stimulating rays for the stimulable phosphor contained in the phosphor sheet is different from the wavelength region of the light emitted by the phosphor. More in detail, the stimulating rays may slightly contribute to the exposure of the photosensitive material, but the photosensitive material has prominently lower sensitivity in the wavelength region of the stimulating rays than in the wavelength. region of the maximum sensitivity.

Further, in the second method of present invention the locational information on the radioactively labeled substances can be also obtained as electric signals by reading out the stimulated emission under irradiation of the stimulable phosphor sheet with stimulating rays. The phosphor sheet is so suitably irradiated with stimulating rays stepwise at a certain time that at least a portion of the radiation energy remaining in the phosphor sheet can be efficiently released as stimulated emission. A portion of the stimulated emission under the first irradiation contributes to the formation of an image on the photosensitive material and another portion of the stimulated emission under the second or latter irradiation is detected and converted into electric signals. The operation of exposing the photosensitive material may be performed before or after the operation of reading out the stimulated emission.

Thus, the locational information on the radioactively labeled substances can be obtained not only as electric signals but also as an image on the photosensitive material. This means that the locational information can be kept in the form of electric signals or A/D converted digital signals in a magnetic tape and also kept in the form of an image on a photosensitive material.

In addition to the above-described advantages, the stimulable phosphor sheet combined with the support medium in layers can be subjected to the exposure operation and/or the read-out operation. That is, the read-out operation can be performed without separating the support medium from the phosphor sheet after storing and recording the autoradiograph as radiation energy in the combined form thereof, and/or the exposure (visualization) operation can be performed after further placing the photosensitive material thereon. Particularly, when the support medium and phosphor sheet are in the integrated structure, it is not necessary to scratch the medium such as a gel off the phosphor sheet or to wash the medium off the phosphor sheet with an appropriate solvent so that the autoradiographic procedure can be simplified.

When the read-out system (being capable of functioning as an exposure device) for reading out the locational information stored and recorded on the stimulable phosphor sheet is shielded from penetration of light from outside, the exposure operation is not required to be conducted in a dark room. Accordingly, it becomes possible to combine the exposure operation with the read-out operation in one successive stage.

In the third method of the present invention, when the stimulable phosphor sheet combined with the photosensitive material in layers is read out, it is further possible to simultaneously perform the detection of electric signals and the exposure of the photosensitive material That is, a portion of stimulated emission enters a photosensor such as a photomultiplier arranged in the vicinity of the phosphor sheet to be detected and converted into electric signals, and at the same time, the photosensitive material combined with the phosphor sheet is exposed to another portion of the stimulated emission to form an image thereon.

Also in this method, the inventor has found that the photosensitive material may be provided on the surface side of the stimulable phosphor sheet to be irradiated with stimulating rays. The light emitted by the phosphor sheet first enters the photosensitive material and a portion thereof is absorbed by the photosensitive substance in the photosensitive material to contribute to the formation of an image. The other portion of the emitted light having passed through the photosensitive material enters the photosensor and is detected thereby to obtain electric signals. The photosensitive material is substantially exposed only to the stimulated emission without being effected by the stimulating rays to form a desired image on the phostosensitive material because of the difference of wavelength region therebetween as described above. On the other hand, the remainder of the stimulated emission can be obtained as electric signals with good accuracy without the influence of fluctuation in the sensitivity of the photosensitive material by adjusting a read-out gain in the read-out system to an appropriate value.

Therefore, the read-out operation together with the exposure of the photosensitive material can be conducted and the autoradiographic procedure according to the third method of the invention can be more simplified than that of the second method.

According to the fourth method of the present invention comprising subjecting the three elements (i.e., the photosensitive material, the phosphor sheet and the support medium) in the combined form to the read-out operation, there is given an additional advantage that after the phosphor sheet combined with the support medium in layers (in the superposed form) is subjected to the exposure operation, the photosensitive material is further placed thereon and the read-out operation can be conducted without separating the phosphor sheet from the support medium.

Particularly, when a structure where the stimulable phosphor sheet and support medium are integrated is used, the above-mentioned operation for separating the medium from the phosphor sheet is not required. Further, it is not necessary to specifically conduct the exposure operation in a dark room in the case of the read-out system being shielded from penetration of light from the outside. The operation of storing and recording the autoradiograph on the phosphor sheet is conducted by allowing the phosphor sheet combined with the support medium and photosensitive material in layers to stand within the read-out system for a certain period of time, and subsequently the read-out operation together with the exposure operation can be conducted. Accordingly, it becomes possible to combine the storing and recording operation with an operation serving both as the read-out of the phosphor sheet and the exposure of the photosensitive material in one successive stage.

BRIEF DESCRIPTION OF DRAWINGS

FIGS. 1-(3) and 1-(4) show embodiments of a support medium for resolution, a stimulable phosphor sheet and a photosensitive material in a superposed form.

DETAILED DESCRIPTION OF THE INVENTION

Figure 1:
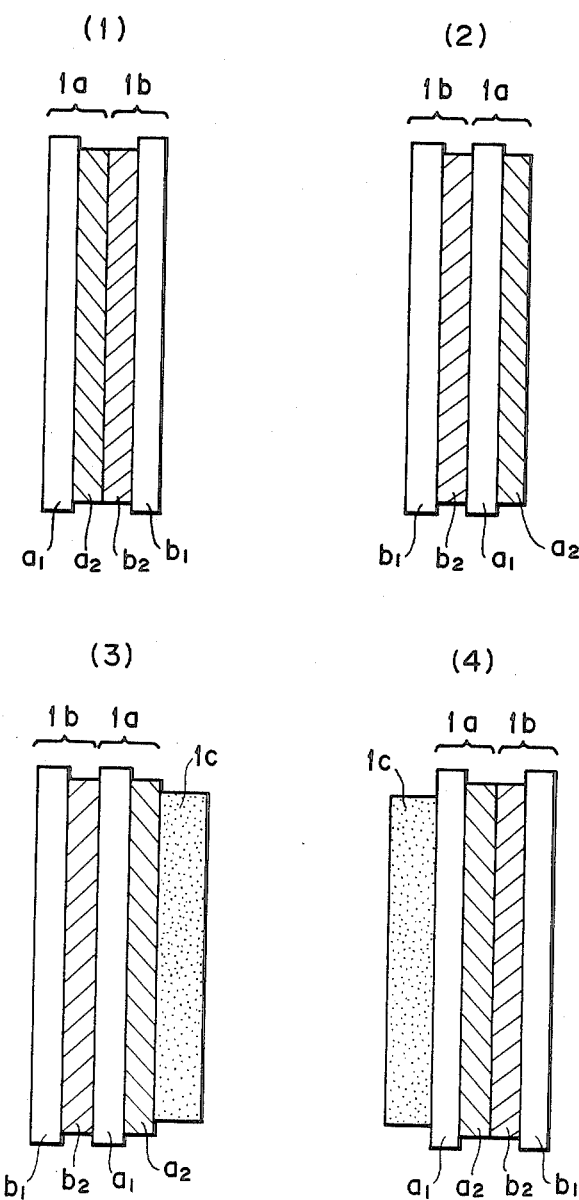
FIGS. 1-(1) and 1-(2) show embodiments of a stimulable phosphor sheet and a photosensitive material in a superposed form.

The stimulable phosphor sheet used in the present invention basically comprises a support and at least one phosphor layer, and the phosphor layer comprises a binder and a stimulable phosphor dispersed therein. Further, a transparent protective film is generally provided on the free surface (surface not facing the support) of the phosphor layer to keep the phosphor layer from chemical deterioration or physical shock.

The stimulable phosphor sheet of such constitution can be prepared, for instance, by the following procedure.

A material of the support of the stimulable phosphor sheet can be selected from those employed in conventional radiographic intensifying screens or those employed in known stimulable phosphor sheets. Examples of the support material include plastic films such as films of cellulose acetate and polyethylene terephthalate, a metal sheet such as aluminum foil, paper sheets such as an ordinary paper, baryta paper and resin-coated paper, or the like. On the surface of the support to receive the phosphor layer may be provided one or more of an adhesive layer, a light-reflecting layer, a light-absorbing layer, etc. Further, the phosphor layer-side surface of the support (or the surface of an adhesive layer, light-reflecting layer or light-absorbing layer in the case where such layers provided on the phosphor layer) may be provided with protruded and depressed portions, as described in U.S. patent application Ser. No. 496,278 and European Patent Publication No. 92241.

Onto the above-mentioned support, a phosphor layer is provided. The phosphor layer comprises basically a binder and stimulable phosphor particles dispersed therein.

The stimulable phosphor, as described hereinbefore, gives stimulated emission when excited with stimulating rays after exposure to a radiation. From the viewpoint of practical use, the stimulable phosphor is desired to give stimulated emission in the wavelength region of 350-500 nm when excited by stimulating rays in the wavelength region of 600-830 nm. Preferably employed in the invention is an europium activated alkaline earth metal fluorohalide phosphor, but any other stimulable phosphor can be employed in the invention.

Examples of the stimulable phosphor include:

SrS:Ce,Sm, SrS:Eu,Sm, ThO$_2$:Er, and La$_2$O$_2$S:Eu,Sm, as described in U.S. Pat. No. 3,859,527;

ZnS:Cu,Pb, BaO.$x$Al$_2$O$_3$:Eu, in which x is a number satisfying the condition of $0.8 \leq x \leq 10$, and M$^{2+}$O.$x$SiO$_2$:A, in which M$^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leq x \leq 2.5$, as described in U.S. Pat. No. 4,326,078;

(Ba$_{1-x-y}$,Mg$_x$,Ca$_y$)FX:aEu$^{2+}$, in which X is at least one element selected from the group consisting of Cl and Br, x and y are numbers satisfying the conditions of $0 < x + y \leq 0.6$, and $xy = 0$, and a is a number satisfying the condition of $10^{-6} \leq a \leq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078; and (Ba$_{1-x}$, M$^{II}_x$)FX:yA, in which M$^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leq x \leq 0.6$ and $0 \leq y \leq 0.2$, respectively, as described in U.S. Pat. No. 4,239,968.

In the first place, phosphor particles and a binder are added to an appropriate solvent (e.g., a lower alcohol, chlorine atom-containing hydrocarbon, ketone, ester, ether), and then they are well mixed to prepare a coating dispersion comprising the phosphor particles dispersed in the binder solution.

Examples of the binder include proteins such as gelatin and synthetic polymers such as polyvinyl acetate, nitrocellulose, polyurethane, polyvinyl alcohol, linear polyester and polyalkyl (meth)acrylate.

The ratio between the binder and the phosphor in the coating dispersion generally is within the range of from 1:8 to 1:40 (binder:phosphor, by weight).

The coating dispersion is then coated evenly on a support to form a coating layer, and the coating layer is gradually heated to dryness to prepare the phosphor layer on the support. The thickness of the phosphor layer generally ranges from 50 to 500 μm.

On the surface of the phosphor layer opposite to the surface to face the support, a transparent protective film may be provided to protect the phosphor layer from physical and chemical deterioration. Examples of the material of the protective film include cellulose acetate, polymethyl methacrylate, polyethylene terephthalate and polyethylene. The thickness of the transparent protective film generally ranges from 0.1 to 20 μm.

The support medium for resolving (or developing) radioactively labeled substances originating from an organism can be selected from those employed or proposed to employ in the conventional autoradiography. Representative examples of the support medium include a medium for electrophoresis such as a gel support e.g., polyacrylamide gel; a medium for paper chromatography such as a filter paper; and a medium for thin layer chromatography such as silica gel. The support medium is generally subjected to the exposure operation in a dry state, but it may be used in a wet state such as containing a resolving solvent, if desired. Further, the support medium can be encased or supported by an accessory means such as glass plate or plastic sheet.

The resolving support medium may be originally provided on the stimulable phosphor sheet to give an integrated structure. The intensity of a radiation (such as $\alpha$-rays, $\beta$-rays or the like) radiating from the radioactively labeled substances is so low that the support medium is preferably provided directly on the surface of the phosphor layer (or the surface of the protective film when used) of the phosphor sheet.

Moreover, the surface of the stimulable phosphor sheet on which a support medium is superposed may be previously subjected to any of various surface treatments to increase the adhesion between the phosphor sheet and the support medium. For example, the protective film-side surface (or the support-side surface) may be previously subjected to a surface activation treatment such as a glow discharge treatment or a roughing treatment to impart hydrophilic property thereto. Examples of the hydrophilically treated stimulable phosphor sheet is described in U.S. patent application Ser. No. 582,767 and European patent application No. 84101963.1.

The kits for the autoradiographic process (separation type and integrated type) comprising a support medium for resolution and a stimulable phosphor sheet as described above are described more in detail in the aforementioned U.S. patent application Ser. No. 549,417 and European patent application No. 83110984.8.

The photosensitive material used in the present invention has a basic structure comprising a support and a photographic emulsion layer. The photographic emulsion layer comprises a binder such as gelatin and silver halide (photosensitive substance) dispersed therein. For instance, the photosensitive material is prepared by providing the emulsion layer onto the transparent support such as a polyethlene terephthalate sheet. A representative example of the photosensitive material includes a photographic film such as a high-speed type X-ray film.

The autoradiographic process of the present invention will be described hereinbelow.

Examples of the sample to be resolved in the invention include radioactively labeled organism-originating substances such as biopolymers, for instance, proteins, nucleic acids, their derivatives, their cleavage products, and their synthetic products. However, the organism-originating substances to be applied to the process of the invention are by no means restricted to the biopolymers as described above. The radioactivity label can be attached to the sample by introducing thereinto a radioactive element by appropriate means. Any radioactive element can be employed in the invention, provided that the radioactive element emits a radiation such as $\alpha$-rays, $\beta$-rays, $\gamma$-rays, neutron beams and X-rays. Typical examples of the radioactive elements include $^{32}P$, $^{14}C$, $^{35}S$, $^{3}H$, and $^{125}I$.

Methods for resolving (or developing) the radioactively labeled substances on a support medium, for instance, methods for electrophoretically resolving a sample thereon are well known by those skilled in the art, and any of these methods can be employed in the present invention.

The storing and recording operation is then carried out by placing the stimulable phosphor sheet and the support medium having the radioactively labeled substances resolved thereon together in layers, preferably in a dark room or in a light-shielded box for a certain period of time. Since the intensity of a radiation radiating from the labeled substances in the support medium is usually low, the phosphor sheet and the support medium can be superposed so as to bring the surface of the phosphor layer (or the surface of the protective film) into contact with the support medium. However, it is possible to superpose the support medium on the support-side surface of the phosphor sheet.

By causing the stimulable phosphor sheet to absorb at least a portion of a radiation radiating from the radioactively labeled substances in the support medium in the storing and recording operation, an autoradiograph is recorded as a radiation energy-stored image on the phosphor sheet.

The storing and recording time varies depending on the radiation intensity of the radioactively labeled substances contained in the support medium, the amount of said substances and the sensitivity of the stimulable phosphor sheet. In the present invention using the stimulable phosphor sheet as a radiosensitive material, however, the storing and recording time can be greatly shortened as compared with the exposure time required in the case using the conventional radiographic film. Further, the precise control of the storing and recording time is not particularly required, since the locational information on the radioactively labeled substances can be suitably processed in the subsequent read-out operation through applying various electrical processing thereto according to the intensity and distribution of energy stored in the phosphor sheet and the desired information form, for example, by setting the amplification of electric signals to an appropriate value.

There is no specific limitation on the temperature employed for the storing and recording operation, and it is possible to perform the storing and recording at an ambient temperature within the range of 10° to 35° C. in the autoradiography according to the present invention. If desired, the storing and recording operation may be naturally performed at a low temperature of approx. 5° C. or lower as in the conventional autoradiography.

When the read-out system of the stimulable phosphor sheet is shielded from light in the case of reading out (and exposing the photosensitive material) in the form of combining the support medium and the phosphor sheet in layers, the storing and recording can be performed therein after the support medium, the phoshpor sheet and the photosensitive material are combined together in layers even in a light room as described hereinafter.

In the case of using the support medium and the stimulable phosphor sheet in the integrated form, there is no need of performing the step of combining them together in layers before the storing and recording operation. The radiation energy stored in the phosphor sheet in the course of resolution of a sample on the support medium is released as light emission by irradiating the phosphor sheet with appropriate light or heat rays. More in detail, since the phosphor sheet is exposed to the natural radioactivity contained in a sample and to a radiation from the running radioactively labeled substances during the resolution, the radiation energy-stored image different from the objective autoradiograph is formed on the phosphor sheet to introduce a noise into the desired radiation energy-stored image. Thus, when the influence of the noise on the autoradiograph is not ignorable, it is prefered to erase the noise before the radiation energy-stored image having the desired autoradiograph is formed on the phosphor sheet.

The noise-erasing operation may be applied to the support medium having the sample resolved thereon as such or after optionally applying thereto a drying treatment or a resolved substance-fixing treatment.

Subsequently, the operation of visualizing the autoradiograph stored and recorded in the stimulable phosphor sheet on the photosensitive material is performed. The phosphor sheet combined together with the support medium in layer (in the superposed form) is subjected as such to the exposure operation. Alternatively, the support medium is separated from the phosphor sheet, and the photosensitive material and phosphor sheet are then placed together in layers and subjected to the exposure operation. The support medium can be easily removed from the phosphor sheet, for instance, by peeling the medium off the phosphor sheet, scraching it off the sheet, or washing it off the sheet with a solvent such as water.

The photosensitive material and the phosphor sheet may be placed together in layers before or after the storing and recording operation. However, when the erasing operation is conducted, the exposure operation must be conducted after the erasing operation. When the storing and recording operation and the read-out operation (or the exposure operation) are continuously conducted in the read-out system, it is preferred to conduct the above operation before the storing and recording operation.

FIG. 1 shows the typical embodiments according to the present invention, wherein the former two of the stimulable phosphor sheet, the photosensitive material and the support medium and all the three are respectively arranged in a superposed form for the exposure operation (or the storing and recording operation and the read-out operation).

In FIG. 1, numeral $1a$ represents the stimulable phosphor sheet comprising a support $a_1$ and a phosphor layer $a_2$, numeral $1b$ represents the photosensitive material comprising a support $b_1$ and a photographic emulsion layer $b_2$, and numeral $1c$ represents the support medium for resolution.

FIG. 1-(1) is a schematic view showing a form in which the photosensitive material $1b$ is superposed on the phosphor layer $a_2$ of the stimulable phosphor sheet $1a$.

FIG. 1-(2) is a schematic view showing a form in which the photosensitive material $1b$ is superposed on the support $a_1$ of the phosphor sheet $1a$.

FIG. 1-(3) is a schematic view showing a form in which the support medium $1c$ is superposed on the phosphor layer $a_2$ of the phosphor sheet $1a$ and the photosensitive material $1b$ is superposed on the support $a_1$ of the phosphor sheet.

FIG. 1-(4) is a schematic view showing a form in which the photosensitive material $1b$ is superposed on the phosphor layer $a_2$ of the phosphor sheet $1a$ and the support medium $1c$ is superposed on the support $a_1$ of the phosphor sheet.

While some embodiments have been shown by FIGS. 1-(1) to 1-(4), it will be understood that other forms can be used in the present invention, as far as the storing and recording operation and the exposure operation and if desired, the read-out operation can be done. Further, the exposure operation may be done by keeping the phosphor sheet in a position adjacent to the support medium.

In the above superposed forms, a radiation from the radioactively labeled substances in the support medium is absorbed by the phosphor layer of the stimulable phosphor sheet and stored therein, and stimulated emission is given by the phosphor layer under the irradiation with stimulating rays. Accordingly, when the superposed form of the former two elements among the phosphor sheet, the photosensitive material and the support medium is used, it is desirable to place them together in layers in such a manner that the phosphor layer is brought in contact with the emulsion layer as shown by FIG. 1-(1). When the superposed form of all the above three is used, it is desirable to place them together in layers in such a manner that the support medium is superposed on the phosphor layer-side of the phosphor sheet and the support-side thereof is brought in contact with the emulsion layer of the photosensitive material as shown by FIG. 1-(3).

In the case of operating the read-out in the superposed forms, the superposed form is so kept in the subsequent read-out operation that the photosensitive material and the stimulable phosphor sheet (or these elements and further the support medium) are desired to be enough fixed not to slip off from each other. For instance, a combination of the stimulable phosphor sheet and the photosensitive material, or another combination of the stimulable phosphor sheet, the photosensitive material and the support medium may be tightly held by transparent glass plates to attain good contact with each other.

The exposure operation according to the first method of the invention for visuallizing the autoradiograph having the locational information on the radioactively labeled substances which has been stored and recorded on the stimulable phosphor sheet can be performed, for example, as follows.

The whole surface of the stimulable phosphor sheet is scanned with such a laser beam having a small spot size as employed in the read-out operation described hereinafter, whereby at least a portion of the radiation energy stored in the phosphor sheet is sequentially released as stimulated emission and the photosensitive material combined with the phosphor sheet is exposed threreto. The scanning with the laser beam can be done against the phosphor sheet-side (or the support medium-side in the case that the medium is superposed on the phosphor sheet) or the photosensitive material-side. The laser beam used herein is so selected as to avoid overlapping of wavelength region thereof with the main wavelength region of the stimulated emission given by the phosphor sheet and not to expose the photosensitive material thereto. For this reason, the employable laser beam depends on the nature of the stimulable phosphor in the phosphor sheet and on the photosensitive substance in the photosensitive material, and preferably employed is a laser beam having a wavelength in the red region. The exposure operation can be done in the same apparatus (read-out apparatus) as employed for the read-out operation.

Alternatively, the stimulable phosphor sheet combined with the photosensitive material in layers may be scanned on the whole surface with a scanning light having a wide spot. Also may be subjected the phosphor sheet to flooding with stimulating rays such as a lamp. There may be employed another method in which the phosphor sheet is arranged closely adjacent to the photosensitive material in such a manner that an image formation with lens of the phosphor sheet surface is made on the surface of the photosensitive material, and the whole surface of the sheet is scanned with the wide-spot scanning light or subjected to the flooding (namely, lens image formation method).

The photosensitive material on which the latent image is formed by the exposure operation is then separated from the phosphor sheet and developed to obtain a visible image corresponding to the autoradiograph of the radioactively labeled substances in the support medium. Thus obtained image is the same as the autoradiographic image obtained by the conventional radiography.

In the second method of the present invention, the above-irradiated stimulable phosphor sheet is further irradiated with stimulating rays and the autoradiograph having the locational information which has been stored and recorded thereon can be obtained as electric signals, by adjusting the irradiation with the stimulating rays in the exposure operation, that is, causing the phosphor sheet to release only a certain portion of the radiation energy stored therein. The operation for reading out the locational information as electric signals can be carried out in the similar manner to one described below, but the phosphor sheet only or the phosphor sheet combined with the support medium is subjected thereto. In the present invention, the irradiation with stimulating rays and the detection of stimulated emission are preferred to be done from the phosphor layer-side of the phosphor sheet. The read-out operation may be also done before the exposure operation of the photosensitive material.

Instead of the read-out method comprising reading out once as described below, it can be also employed another method which comprises a preliminary read-out operation of scanning the stimulable phosphor sheet with stimulating rays to decide a one-dimensional direction of the resolution of the radioactively labeled substances based on the obtained digiatal signals and a final read-out operation of scanning a part of the phosphor sheet along the decided direction therewith, in the case of obtaining locational information on the labeled substances one-dimensionally resolved on the support medium such as DNA sequencing. Such method for detecting signals is described more in detail in Japanese patent application No. 58-57417 (corresponding to U.S. patent application Ser. No. 595,479 or European patent application No. 84103619.7). According to the method, it is not necessary to scan the whole surface of the phosphor sheet with stimulating rays and only the digital signals having the objective locational information are efficiently obtained so that the read-out time in the final read-out operation can be shortened. The employable read-out apparatus can be simplified and inexpensive because there is no need of scanning with high accuracy.

Alternatively, in the case that rows of one-dimensional resolution of the radioactively labeled substances such as electrophretic rows are formed straight and in parallel with each other on the support medium, the preliminary read-out operation can be omited by previously adjusting the scanning condition (scanning direction, scanning width, etc.) in the final read-out operation. Thus, the read-out operation can be further simplified.

Therefore, in the second method the visualization of the autoradiograph having the locational information on the radioactively labeled substances, which is stored and recorded on the stimulable phosphor sheet, and the read-out of the locational information can be carried out by using only one phosphor sheet. Especially, when the exposure and the read-out are conducted in the form of combining the support medium with the phosphor sheet in layers, the autoradiographic process can be simplified to comprise three stages of resolving the sample on the support medium, exposing the photosensitive material with the phosphor sheet including storing and recording the autoradiograph on the phosphor sheet, and reading out the phosphor sheet. Further, when the exposure and the read-out are conducted in the same apparatus, the process can be more simplified to comprise only two stages.

The read-out operation for detecting the autoradiograph stored and recorded on the stimulable phosphor sheet as electric signals will be described briefly with respect to the third method of the invention, referring to an embodiment of a read-out system shown in FIG. 2 of the accompanying drawings. In the third method, the read-out operation is applied to the phosphor sheet combined with the photosensitive material so that the read-out operation also serves as the exposure operation of the photosensitive material.

Figure 2:
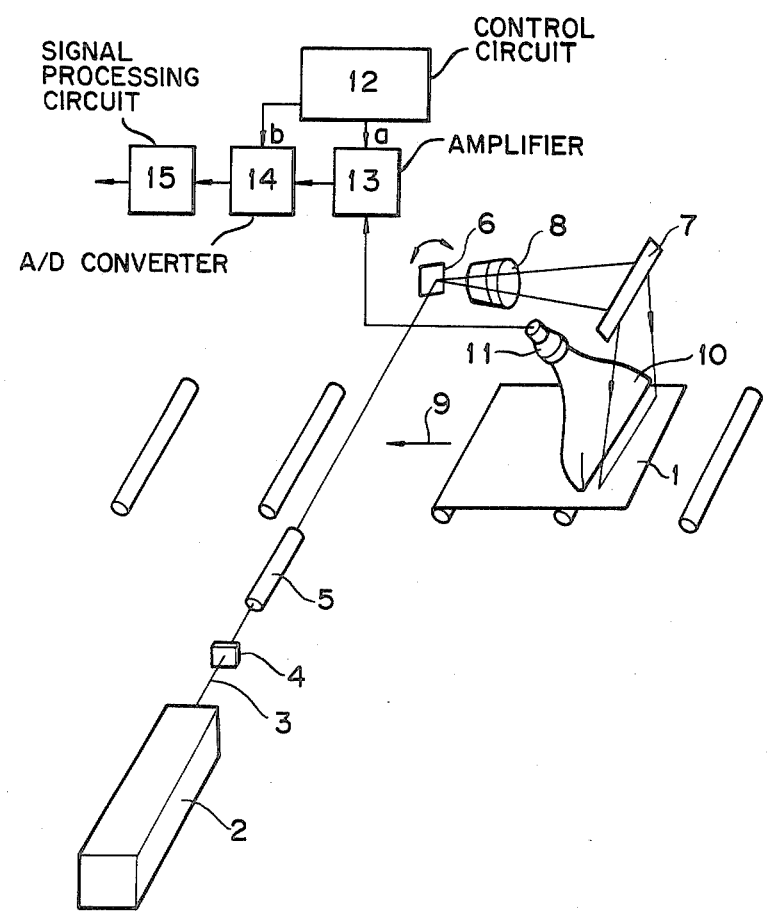
FIG. 2 schematically shows an embodiment of a read-out system for reading out the locational information on the radioactively labeled substances in a support medium, which is stored and recorded on the stimulable phosphor sheet according to the present invention.

FIG. 2 schematically shows an embodiment of the read-out system for reading out the information on one or two dimensional location of the radioactively labeled substances, which is stored and recorded on the photosensitive material-superposed stimulable phosphor sheet 1 shown in FIG. 1-(1) wherein numeral 1a represents the stimulable phosphor sheet and 1b represents the photosensitive material.

In the read-out system, the read-out operation is carried out in the following manner.

Laser beam 3 generated by a laser source 2 first passes through a filter 4 to cut off a light beam in the wavelength region corresponding to the wavelength region of stimulated emission to be emitted from the phosphor sheet 1a in response to stimulation with the laser beam 3. The size of the beam diameter of the laser beam 3 passed through the filter 4 is strictly controlled by means of a beam expander 5. The laser beam is subsequently deflected by a beam deflector 6 such as a galvanometer mirror and reflected by a plane reflection mirror 7. The deflected beam then impinges one-dimensionally upon the photosensitive material 1b of the photosensitive material-superposed stimulable phosphor sheet 1. An f-θ lens 8 is provided between the beam deflector 6 and the plane reflection mirror 7 so that the beam speed is continuously kept constant when the deflected laser beam is scanned on the photosensitive material 1b.

The laser source 2 used herein is so selected as to avoid overlapping of the wavelength region of the laser beam 3 with the main wavelength region of the stimulated emission to be given by the stimulable phosphor sheet 1a. Further the wavelength region of the laser beam 3 is so selected as to avoid the exposure of the photosensitive material 1b. Preferred laser beam is one having a wavelength within the red region, though the employable wavelength region varies depending on the phosphor in the phosphor sheet and the photosensitive substance in the photosensitive material. The photosensitive material-superposed phosphor sheet 1 is then transferred to the direction along the narrow 9 under the irradiation of the above-mentioned deflected laser beam. Therefore, the whole surface of the phosphor sheet 1a is subjected to the irradiation of the deflected laser beam through the photosensitive material 1b.

When irradiated with the above-mentioned laser beam, the phosphor sheet 1a gives stimulated emission having the intensity proportional to the radiation energy stored therein. A portion of the emission is absorbed by the photosensitive material 1b and an image (latent image) is formed on the photosensitive material 1b. On the other hand, the other portion of the emission enters through the photosensitive material 1b into a light guiding sheet 10. The light guiding sheet 10 has a linear edge face for receiving the emission and the edge face is so positioned in the vicinity of the photosensitive material as to correspond to the scanning line on the photosensitive material 1b. The exit of the light guiding sheet 10 is in the form of a ring and is connected to an light-receiving face of a photosensor 11 such as a photomultiplier. The light guiding sheet 10 is made, for instance, by processing a sheet of a transparent thermoplastic resin such as a synthetic acrylic resin, and so constitutded that the emission introduced from the linear edge face is transferred to the exit under total reflection within the sheet 10. The stimulated emission from the phosphor sheet 1a is guided in the interior of the light guiding sheet 10 to the exit, and received by the photosensor 11. On the light-receiving face of the photosensor 11 is provided with a filter which allows only the light in the wavelength region of the stimulated emission to pass therethrough and cuts off the light in the wavelength region of the stimulating rays (laser beam) so as to detect only the stimulated emission. The stimulated emission detected by the photosensor 11 is converted to electric signals, amplified to electric signals adjusted to an appropriate level in an amplifier 13 according to an amplification degree setting value a provided from a control circuit 12 and transmitted to an A/D converter 14. The adjusted electric signals are then converted to digital signals according to an appropriate scale factor defined by a scale factor setting value b provided from the same control circuit 12, and supplied to a signal processing circuit 15. In the circuit 15, the digital signals are suitably processed to output digital data, which are then transmitted to a recording device (not shown), optionally upon storage in a storing means such as a magnetic tape.

The amplification degree setting value a, and the scale factor setting value b provided from the control circuit 12 can be set, for instance, according to the stored and recorded information obtained by carrying out a preliminary read-out operation prior to the above read-out operation so as to obtain signals having good levels. Alternatively, when the contents of the radioactive substances contained in a sample are previously known, the setting values can be experimentally set according to the exposure time of the phosphor sheet.

In the signal processing circuit 15, the supplied digital signals are computerized so as to analyze the distribution and the radiation intensity of the radioactively labeled substances, and the locational information thereon can be obtained as symbols and/or numeralized digital data. Such a signal processing method for obtaining the locational information on one-dimensionally distributed radioactively labeled substances as symbols and/or numerals is described in, for instance, the aforementioned U.S. patent application Ser. No. 568,877 or European patent application No. 84100144.9. Alternatively, in the circuit 15, the digital signals are so processed according to an image processing condition setting value c (not shown) provided from the control circuit 12 as to give a well-readable image having well adjusted concentration and contrast. Examples of the image processing include spatial frequency processing, gradation processing, substraction processing, etc.

Various recording devices based on various systems can be employed for the above-described purpose, for instance, a device for visualizing optically by scanning a photosensitive material with a laser beam, etc., a display means for visualizing electrically on CRT, etc., a means for printing a radiation image displayed on CRT by means of video printer, and a means for visualizing on a heatsensitive recording material using thermic rays.

The method for reading out the locational information on the radioactively labeled substances stored in the stimulable phosphor sheet is not restricted to those described above, and other suitable methods can be also used in the present invention.

For instance, the phosphor sheet may be irradiated with the stimulating rays on the phosphor sheet-side (namely, the support-side thereof) and the stimulated emission may be also detected therefrom, instead of the irradiation and detection from the photosensitive material-side as described above.

The photosensitive material having the latent image formed thereon by the exposure to the stimulated emission is separated from the phosphor sheet and developed to obtain a visible image corresponding to the autoradiograph of the radioactively labeled substances in the support medium.

While the read-out operation for the embodiment shown by FIG. 1-(1) has been described above (namely, the third method), the read-out of the stimulable phosphor sheet and the exposure of the photosensitive material for the other embodiments can be carried out in a similar manner to that described above by irradiating one side of the phosphor sheet combined with the photosensitive material and the support medium in layers, with stimulating rays (namely, the fourth method). In the fourth mehod, it is preferred to conduct the irradiation of the stimulating rays and the detection of the stimulated emission on the phosphor layer-side.

The confirmation and the further analysis of the resulting locational information on the radioactively labeled substances can be made by directly comparing the obtained digital data with the visualized autoradiograph on the photosensitive material. Further, this autoradiographic image can be compared with an image reproduced from the image-processed digital data.

Accordingly, in the third and fourth methods the read-out and the visualization of the autoradiograph having the locational information on the radioactively labeled substances stored and recorded on the stimulable phosphor sheet can be simultaneously conducted. Particularly, when the phosphor sheet combined with the support medium in layers is subjected as such to the read-out operation (namely, the fourth method), the autoradiographic process can be simplified to substantially comprise the resolving stage and the read-out stage including the exposure.

The prsent invention will be further described by the following examples, in which an embodiment of the preliminary procedure for DNA sequencing is described.

The support mediums for resolution, which were used in the following examples were ones for electrophoresis, composed of a slab gel (1.5 mm×200 mm×200 mm) containing 8% of polyacrylamide (cross-linking agent content: 3%) prepared by a conventional method.

The stimulable phosphor sheets were prepared by the following method.

To a mixture of a particulate divalent europium activated barium fluorobromide stimulable phosphor (BaFBr:Eu$^{2+}$) and a linear polyester resin were added successively methyl ethyl ketone and nitrocellulose (nitrification degree: 11.5%), to prepare a dispersion containing the phosphor particles. Subsequently, tricresyl phosphate, n-butanol and methyl ethyl ketone were added to the resulting dispersion. The mixture was sufficiently stirred by means of a propeller agitator to obtain a homogeneous coating dispersion having a viscosity of 25-35 PS (at 25° C.).

The coating dispersion was applied to a polyethylene terephthalate sheet (support, thickness: 250 μm) placed horizontally on a glass plate. The application of the coating dispersion was carried out using a doctor blade. The support having a layer of the coating dispersion was then placed in an oven and heated at a temperature gradually rising from 25° to 100° C. Thus, a phosphor layer having a thickness of 300 μm was formed on the support.

On the phosphor layer was placed a transparent polyethylene terephthalate film (thickness: 12 μm; provided with a polyester adhesive layer on one surface) to combine the film and the phosphor layer with the adhesive layer. Thus, a stimulable phosphor sheet comprising a support, a phosphor layer and a protective film was prepared.

EXAMPLE 1

[Separation of DNA to be sequenced and labeling with a radioactive element]

Plasmid DNA of *E. coli* (pBR 322) was cleaved by the use of restriction enzyme Hind-III by the known method and 5'-end thereof was labeled with $^{32}$P to obtain 1 μg. of a double helix DNA ($^{32}$P-labeled substance).

The double helix DNA (1 μg.) and approx. 1 unit of the restriction enzyme Hae-III were added to 20 μl. of 20 mM of tris[tris(hydroxylmethyl)aminoethane]-hydrochloric acid buffer solution (pH 7.4) containing 5 mM of magnesium chloride and 1 mM of dithiothreitol. The resulting mixture was kept at 37° C. for one hour to perform the specific cleavage reaction and a cleaved mixture solution containing cleavage products was obtained.

The sample of cleaved mixture solution was charged on the slab gel support medium and electrophoresed at voltage of 500 V using 50 mM tris-borate buffer solution (pH 8.3) containing 1 mM of EDTA as an electrode solution. The electrophoresis was continued until the marker dye previously added to the sample reached the bottom end of the gel, and the starting position thereof was marked with a $^{32}$P-containing ink.

Subsequently, the above gel support medium and the stimulable phosphor sheet were placed together in layers and kept at room temperature (approx. 25° C.) for 12.5 minutes to perform the storing and recording of an autoradiograph of the sample on the phosphor sheet.

The support medium was separated from the phosphor sheet, and an X-ray film (RX type manufactured by Fuji Photo Film Co., Ltd.) was superposed on the protective film-side of the phosphor sheet. The X-ray film-superpoxsed phosphor sheet was introduced into a read-out apparatus as shown in FIG. 2 and then the phosphor sheet was scanned with an He-Ne laser beam (wavelength: 633 nm; light energy: $7 \times 10^{-4}$J/cm$^2$) to expose the X-ray film to stimulated emission given by the divalent europium activated barium fluorobromide phosphor (peak wavelength: 390 nm).

After separating the X-ray film from the phosphor sheet, the X-ray film was developed. The electrophretic pattern of the cleavage products with $^{32}$P label was visualized as an image on the X-ray film.

On the other hand, the phosphor sheet was introduced in the same read-out apparatus again and scanned with the laser beam in the same manner as described above, to read out locational information which represented the electrophoretic positions of the $^{32}$P-labeled fragments (cleavage products) based on the starting position marked with the $^{32}$P-containing ink. According to the thus-obtained locational information, the portions containing the $^{32}$P-labeled fragments wre cut out of the gel with a thin razor blade, and the gel portion segments were placed in a test tube.

For confirmation, the residual gel (a part of which had been removed as above) was laid again on a stimulable phosphor sheet, and the read-out operation was conducted thereto in the read-out apparatus to examine absence of the $^{32}$P-labeled fragment. The result of the examination indicated that the $^{32}$P-labeled fragments had been completely removed from the gel. Thus, it was confirmed that the accuracy of the locational information on $^{32}$P-labeled fragments obtained by means of the above stimulable phosphor sheet provided with the support medium was sufficiently high.

EXAMPLE 2

A sample of cleaved mixture solution was obtained and electrophoresed on the gel support medium in the same manner as described in Example 1.

The gel support medium having the fragments (cleavage products) labeled with $^{32}$P and the stimulable phosphor sheet were placed together in layers and kept at room temperature (approx. 25° C.) for 12.5 minutes to perform the storing and recording of an autoradiograph of the sample.

The support medium was then separated from the phosphor sheet, and an X-ray film (RX type manufactured by Fuji Photo Film Co., Ltd.) was superposed on the protective film-side of the phosphor sheet. The X-ray film-superposed phosphor sheet was introduced into the read-out apparatus as shown in FIG. 2 and then read out to obtain locational information which represented the electrophoretic positions of the $^{32}$P-labeled fragments based on the starting position marked with the $^{32}$P-containing ink. In the read-out operation, an He-Ne laser beam (wavelength: 633 nm; light energy: $7 \times 10^{-4}$J/cm$^2$) was used as the stimulating rays and the stimulated emission of the divalent europium activated barium fluorobromide phosphor (peak wavelength: 390 nm) was detected.

According to the thus-obtained locational information, the portions containing $^{32}$P-labeled fragments were cut out of the gel with a thin razor blade, and the gel portion segments were placed in a test tube.

For confirmation, the residual gel (a part of which had been removed as above) was laid again on the stimulable phosphor sheet, and the read-out operation was carried out thereto in the read-out apparatus to examine absence of the $^{32}$P-labeled fragment. The result of the examination indicated that the $^{32}$P-labeled fragments had been completely removed from the gel. Thus, it was confirmed that the accuracy of the locational information on $^{32}$P-labeled fragments obtained by means of the above stimulable phosphor sheet provided with the support medium was sufficiently high.

On the other hand, the electrophoretic pattern of the cleavage products with $^{32}$P label were visualized as an image on the developed X-ray film.

I claim:

1. An autoradiographic process for obtaining information on one or two dimensional location of radioactively labeled substances originating from an organism and resolved on a support medium, which comprises:
   (1) causing a stimulable phosphor sheet comprising a stimulable phosphor, which is combined with said support medium in layers or has been integrated with said support medium, to absorb at least a portion of radiation energy emitted by the radioactively labeled substances in the support medium; and
   (2) placing a photosensitive material on said stimulable phosphor sheet, and irradiating the phosphor sheet with stimulating rays to release at least a portion of the radiation energy stored in the phosphor sheet as stimulated emission, whereby the photosensitive material is exposed to the stimulated emission to obtain locational information on the radioactively labeled substances as an image on the photosensitive material.

2. The autoradiographic process as claimed in claim 1, wherein said irradiating the stimulable phosphor sheet with the stimulating rays in the step (2) is performed by scanning it with a laser beam.

3. The autoradiographic process as claimed in claim 1, wherein said irradiating the stimulable phosphor sheet with the stimulating rays in the step (2) is performed by flooding it.

4. The autoradiographic process as claimed in claim 1, wherein said stimulable phosphor sheet comprises a support, a phosphor layer comprisng a stimulable phosphor dispersed in a binder, and a protective film.

5. The autoradiographic process as claimed in claim 1, wherein said radioactively labeled substances originating from the organism are biopolymers, derivatives thereof or cleavage products thereof, labeled with a radioactive element.

6. The autoradiographic process as claimed in claim 5, wherein said biopolymers are nucleic acids, derivatives thereof, cleavage products thereof, or synthetic products thereof.

7. An autoradiographic process for obtaining information on one or two dimensional location of radioactively labeled substances originating from an organism and resolved on a support medium, which comprises:
   (1) causing a stimulable phosphor sheet comprising a stimulable phosphor, which is combined with said support medium in layers or has been integrated with said support medium, to absorb at least a portion of radiation energy emitted by the radioactively labeled substances in the support medium;
   (2) placing a photosensitive material on said stimulable phosphor sheet, and irradiating the phosphor sheet with stimulating rays to release at least a portion of the radiation energy stored in the phosphor sheet as stimulated emission, whereby the photosensitive material is exposed to the stimulated emission to obtain locational information on the radioactively labeled substances as an image on the photosensitive material; and
   (3) irradiating the phosphor sheet with stimulating rays to release at least a portion of the radiation energy remaining in the phosphor sheet as stimulated emission, and detecting the stimulated emission to obtain the locational information as electric signals;
   wherein the step (3) is done before or after the step (2).

8. The autoradiographic process as claimed in claim 7, wherein said irradiating the stimulable phosphor sheet with the stimulating rays in the step (2) is performed by flooding it.

9. The autoradiographic process as claimed in claim 7, wherein said irradiating the stimulable phosphor sheet with the stimulating rays in the step (2) is performed by scanning it with a laser beam.

10. The autoradiographic process as claimed in claim 7, wherein said stimulating rays in the step (3) are laser beam.

11. The autoradiographic process as claimed in claim 9, wherein said stimulating rays in the step (3) are the same laser beam as employed in the step (2).

12. The autoradiographic process as claimed in claim 7, wherein said electric signals obtained in the step (3) are converted into digital signals which are then subjected to signal processing to obtain the locational information in the form of symbols and/or numerals.

13. The autoradiographic process as claimed in claim 7, wherein said stimulable phosphor sheet comprises a support, a phosphor layer comprising a stimulable phosphor dispersed in a binder, and a protective film.

14. The autoradiographic process as claimed in claim 7, wherein the radioactively labeled substances originating from the organism are biopolymers, derivatives thereof or cleavage products thereof, labeled with a radioactive element.

15. The autoradiographic process as claimed in claim 14, wherein said biopolymers are nucleic acids, derivatives thereof, cleavage products thereof, or synthetic products thereof.

16. An autoradiographic process for obtaining information on one or two dimensional location of radioactively labeled substances originating from an organism and resolved on a support medium, which comprises:
   (1) placing said support medium and a stimulable phosphor sheet comprising a stimulable phosphor together in layers for a certain period of time to cause said phosphor sheet to absorb at least a portion of radiation energy emitted by the radioactively labeled substances in the support medium; and
   (2) separating said stimulable phosphor sheet from the support medium, placing the phosphor sheet and a photosensitive material together in layers, and then irradiating the phosphor sheet with stimulating rays to release at least a portion of the radiation energy stored in the phosphor sheet as stimulated emission, to a portion of which the photosensitive material is exposed to obtain locational information on the radioactively labeled substances as an image thereon, and another portion of which is detected to obtain the locational information as electric signals.

17. The autoradiographic process as claimed in claim 16, wherein said stimulating rays in the step (2) are laser beam.

18. The autoradiographic process as claimed in claim 17, wherein said laser beam is a red laser beam.

19. The autoradiographic process as claimed in claim 16, wherein the stimulated emission passed through the photosensitive material is detected in the step (2).

20. The autoradiographic process as claimed in claim 16, wherein said electric signals obtained in the step (2) are converted into digital signals which are then subjected to signal processing to obtain the locational information in the form of symbols and/or numerals.

21. The autoradiographic process as claimed in claim 16, wherein said stimulable phosphor sheet comprises a support, a phosphor layer comprising a stimulatable phosphor dispersed in a binder, and a protective film.

22. The autoradiographic process as claimed in claim 16, wherein said support medium is a medium for electrophoresis.

23. The autoradiographic process as claimed in claim 16, wherein said radioactively labeled substances originating from the organism are biopolymers, derivatives thereof or cleavage products thereof, labeled with a radioactive element.

24. The autoradiographic process as claimed in claim 23, wherein said biopolymers are nucleic acids, derivatives thereof, cleavage products thereof, or synthetic products thereof.

25. An autoradiographic process for obtaining information on one or two dimensional location of radioactively labeled substances originating from an organism and resolved on a support medium, which comprises:
   (1) causing a stimulable phosphor sheet comprising a stimulable phosphor, which is combined with said support medium in layers or has been integrated together with said support medium, to absorb at least a portion of radiation energy emitted by the radioactively labeled substances in the support medium; and
   (2) placing a photosensitive material on the surface of said stimulable phosphor sheet, being opposite to the surface facing the support medium, and irradiating the phosphor sheet with stimulating rays to release at least a portion of the radiation energy stored in the phosphor sheet as stimulated emission, to a portion of which the photosensitive material is exposed to obtain locational information on the radioactively labeled substances as an image thereon, and another portion of which is detected to obtain the locational information as electric signals.

26. The autoradiographic process as claimed in claim 25, wherein said stimulating rays in the step (2) are laser beam.

27. The autoradiographic process as claimed in claim 26, wherein said laser beam is a red laser beam.

28. The autoradiographic process as claimed in claim 25, wherein the stimulated emission passed through the photosensitive material is detected in the step (2).

29. The autoradiographic process as claimed in claim 25, wherein said electric signals obtained in the step (2) are converted into digital signals which are then subjected to signal processing to obtain the locational information in the form of symbols and/or numerals.

30. The autoradiographic process as claimed in claim 25, wherein said stimulable phosphor sheet comprises a support, a phosphor layer comprising a stimulable phosphor dispersed in a binder, and a protective film.

31. The autoradiographic process as claimed in claim 25, wherein said support medium is a medium for electrophoresis.

32. The autoradiographic process as claimed in claim 25, wherein said radoactively labeled substances originating from the organism are biopolymers, derivatives thereof or cleavage products thereof, labeled with a radioactive element.

33. The autoradiographic process as claimed in claim 32, wherein said biopolymers are nucleic acids, derivatives thereof, cleavage products thereof or synthetic products thereof.

* * * * *